US011912047B2

United States Patent
Hoffman, Jr. et al.

(10) Patent No.: US 11,912,047 B2
(45) Date of Patent: Feb. 27, 2024

(54) HYBRID SILK SCREEN AND DIRECT-TO-GARMENT PRINTING MACHINE AND PROCESS

(71) Applicant: M&R Printing Equipment, Inc., Roselle, IL (US)

(72) Inventors: Richard C. Hoffman, Jr., Lake Forest, IL (US); Geoff Baxter, Media, PA (US)

(73) Assignee: M&R Printing Equipment, Inc., Roselle, IL (US)

( * ) Notice: Subject to any disclaimer, the term of this patent is extended or adjusted under 35 U.S.C. 154(b) by 372 days.

(21) Appl. No.: 17/191,912

(22) Filed: Mar. 4, 2021

(65) Prior Publication Data

US 2021/0245524 A1 Aug. 12, 2021

Related U.S. Application Data

(63) Continuation of application No. 16/851,702, filed on Apr. 17, 2020, now Pat. No. 10,967,650, which is a (Continued)

(51) Int. Cl.

*B41J 3/407* (2006.01)
*B41J 3/54* (2006.01)
*B41J 11/00* (2006.01)
*B41F 15/10* (2006.01)
*B41F 11/00* (2006.01)
(Continued)

(52) U.S. Cl.

CPC ............. *B41J 3/4078* (2013.01); *B41F 11/00* (2013.01); *B41F 15/0863* (2013.01); *B41F 15/10* (2013.01); *B41F 17/003* (2013.01); *B41J 3/546* (2013.01); *B41J 11/0015* (2013.01)

(58) Field of Classification Search

CPC ...... B41J 3/4078; B41J 3/546; B41J 11/0015; B41J 11/007; B41F 11/00; B41F 15/0863; B41F 15/10; B41F 17/003; B41F 15/14; B41M 1/26; B41M 5/0047; B41M 5/0041
See application file for complete search history.

(56) References Cited

U.S. PATENT DOCUMENTS 3,795,189 A 3/1974 Jaffa
4,248,150 A 2/1981 Lala
(Continued)

FOREIGN PATENT DOCUMENTS

AU 2016308447 B2 6/2020
AU 2020203369 A1 6/2020
(Continued)

OTHER PUBLICATIONS

Yamamoto Nobuya, Inkjet Printer, Mar. 15, 2012, Japan, All Pages (Year: 2012).*
(Continued)

*Primary Examiner* — Justin Seo
*Assistant Examiner* — Tracey M McMillion
(74) *Attorney, Agent, or Firm* — Greensfelder, Hemker & Gale, P.C.; Richard C. Himelhoch

(57) ABSTRACT

A hybrid printing machine is described having both silk screening stations and a direct-to-garment digital printing station with a raster image processor to control a portion of a printing process.

20 Claims, 4 Drawing Sheets

Related U.S. Application Data continuation of application No. 16/192,948, filed on Nov. 16, 2018, now Pat. No. 10,625,517, which is a continuation of application No. 15/235,982, filed on Aug. 12, 2016, now Pat. No. 10,131,160.

(60) Provisional application No. 62/205,416, filed on Aug. 14, 2015.

(51) Int. Cl.
*B41F 15/08* (2006.01)
*B41F 17/00* (2006.01)

(56) References Cited

U.S. PATENT DOCUMENTS

| | | | |
|---|---|---|---|
| 4,735,139 A | 4/1988 | Szarka | |
| 4,819,559 A | 4/1989 | Szarka | |
| 4,909,146 A | 3/1990 | Szarka | |
| 4,939,991 A | 7/1990 | Szarka | |
| 5,063,842 A | 11/1991 | Clarke | |
| 5,129,155 A | 7/1992 | Hoffman, Jr. et al. | |
| 5,195,434 A | 3/1993 | Hoffman, Jr. | |
| 5,199,353 A | 4/1993 | Szyszko | |
| 5,216,820 A | 6/1993 | Green et al. | |
| 5,383,400 A | 1/1995 | Szyszko | |
| D360,423 S | 7/1995 | Neal | |
| 5,456,172 A | 10/1995 | Herrmann | |
| 5,503,067 A | 4/1996 | Jaffa | |
| 5,575,206 A | 11/1996 | Szyszko | |
| 5,592,877 A | 1/1997 | Szyszko et al. | |
| 5,595,113 A | 1/1997 | Daniel et al. | |
| 5,607,243 A | 3/1997 | Szarka | |
| 5,640,905 A | 6/1997 | Szyszko et al. | |
| 5,649,479 A | 7/1997 | Hoffman, Jr. | |
| 5,678,482 A | 10/1997 | Daniel et al. | |
| 5,745,365 A | 4/1998 | Parker | |
| 5,782,184 A | 7/1998 | Albertalli et al. | |
| 5,787,805 A | 8/1998 | Szyszko et al. | |
| 5,809,877 A | 9/1998 | Szyszko et al. | |
| 5,845,569 A | 12/1998 | Tkacz et al. | |
| 5,881,641 A | 3/1999 | Tkacz | |
| 5,887,519 A | 3/1999 | Zelko | |
| 5,921,176 A | 7/1999 | Oleson | |
| 5,937,749 A | 8/1999 | Ford | |
| 5,943,953 A | 8/1999 | Oleson | |
| 5,953,987 A | 9/1999 | Oleson | |
| 6,012,387 A | 1/2000 | Hoffman, Jr. et al. | |
| 6,089,149 A | 7/2000 | Zelko | |
| 6,105,494 A | 8/2000 | Hoffman, Jr. et al. | |
| 6,112,654 A | 9/2000 | Jaffa | |
| 6,142,070 A | 11/2000 | Hoffman, Jr. et al. | |
| 6,161,304 A | 12/2000 | Iaccino et al. | |
| 6,168,269 B1 | 1/2001 | Rasmussen et al. | |
| 6,276,274 B1 | 8/2001 | Hoffman, Jr. et al. | |
| 6,289,802 B1 | 9/2001 | Zelko | |
| 6,361,230 B1 * | 3/2002 | Crystal | B41J 11/0055 347/104 |
| 6,484,629 B1 | 11/2002 | Hoffman, Jr. et al. | |
| 6,698,879 B1 | 3/2004 | Hindriks et al. | |
| 6,780,460 B1 | 8/2004 | Ou-Yang | |
| 6,910,419 B2 | 6/2005 | Oleson | |
| 7,134,749 B2 | 11/2006 | Ben-Zur et al. | |
| 7,562,957 B2 | 7/2009 | Mills et al. | |
| 7,607,745 B2 | 10/2009 | Ben-Zur | |
| 8,292,395 B2 | 10/2012 | Ben-Zur et al. | |
| 8,333,468 B2 | 12/2012 | Laaspere et al. | |
| 8,498,018 B2 | 7/2013 | Doggett et al. | |
| 8,540,358 B2 | 9/2013 | Mozel et al. | |
| 8,640,618 B2 | 2/2014 | Takahata | |
| 8,662,651 B2 | 3/2014 | Kagata et al. | |
| 8,708,437 B2 | 4/2014 | Kushner et al. | |
| 8,746,824 B2 | 6/2014 | Usuda et al. | |
| 8,784,508 B2 | 7/2014 | Ellis | |
| 8,960,891 B2 | 2/2015 | Hacker et al. | |
| 9,150,041 B2 | 10/2015 | Biel et al. | |
| 9,393,773 B2 | 7/2016 | Hoffman, Jr. et al. | |
| 9,527,274 B2 | 12/2016 | Oleson | |
| 9,611,401 B2 | 4/2017 | Mozel et al. | |
| 9,656,475 B2 | 5/2017 | Miller | |
| 10,131,160 B2 | 11/2018 | Hoffman, Jr. et al. | |
| 10,625,517 B2 | 4/2020 | Hoffman, Jr. et al. | |
| 10,899,142 B2 | 1/2021 | Amir et al. | |
| 10,967,650 B2 | 4/2021 | Hoffman, Jr. et al. | |
| 11,021,627 B2 | 6/2021 | Mozel et al. | |
| 11,046,068 B2 | 6/2021 | Richards et al. | |
| 11,072,398 B2 | 7/2021 | Kucaba et al. | |
| 11,077,676 B2 | 8/2021 | Efendi et al. | |
| 11,098,214 B2 | 8/2021 | Shimoni et al. | |
| 2003/0090536 A1 | 5/2003 | Sloan, Jr. | |
| 2003/0121430 A1 | 7/2003 | Eppinger | |
| 2003/0142168 A1 | 7/2003 | Suzuki et al. | |
| 2004/0000240 A1 | 1/2004 | Oleson | |
| 2004/0196346 A1 | 10/2004 | Redding et al. | |
| 2004/0252173 A1 | 12/2004 | Ben-Zur et al. | |
| 2005/0179708 A1 | 8/2005 | Ben-Zur | |
| 2005/0223918 A1 | 10/2005 | Steffen et al. | |
| 2005/0252394 A1 | 11/2005 | Eppinger | |
| 2005/0276646 A1 | 12/2005 | Morimoto et al. | |
| 2006/0162586 A1 | 7/2006 | Fresener et al. | |
| 2006/0207448 A1 * | 9/2006 | Fresener | B41F 15/0863 101/115 |
| 2006/0210719 A1 | 9/2006 | Smith | |
| 2006/0249039 A1 * | 11/2006 | Feldman | B41J 3/546 101/115 |
| 2006/0266232 A1 | 11/2006 | Macchi | |
| 2007/0103529 A1 | 5/2007 | Pearl et al. | |
| 2007/0124870 A1 | 6/2007 | Turner | |
| 2007/0188535 A1 | 8/2007 | Elwakil et al. | |
| 2008/0012884 A1 | 1/2008 | Ben-Zur et al. | |
| 2010/0000429 A1 | 1/2010 | Hoffman, Jr. et al. | |
| 2010/0141694 A1 | 6/2010 | Kurasawa | |
| 2010/0214349 A1 | 8/2010 | Ozawa | |
| 2011/0254888 A1 | 10/2011 | Kasahara | |
| 2011/0290127 A1 | 12/2011 | Biel et al. | |
| 2013/0284036 A1 | 10/2013 | Wade et al. | |
| 2014/0261029 A1 | 9/2014 | Oleson | |
| 2015/0068417 A1 | 3/2015 | Szyszko | |
| 2016/0023454 A1 | 1/2016 | Sloan | |
| 2016/0207301 A1 | 7/2016 | Szyszko | |
| 2017/0043592 A1 * | 2/2017 | Hoffman, Jr. | B41F 15/0863 |
| 2017/0145239 A1 | 5/2017 | Mozel et al. | |
| 2018/0148592 A1 | 5/2018 | Morrison et al. | |
| 2018/0320016 A1 | 11/2018 | Iraqi et al. | |
| 2018/0370253 A1 | 12/2018 | Ohnishi | |
| 2019/0144699 A1 | 5/2019 | Iraqi et al. | |
| 2019/0152237 A1 | 5/2019 | Hoffman, Jr. et al. | |
| 2019/0202214 A1 | 7/2019 | Allen et al. | |
| 2020/0316963 A1 | 10/2020 | Hoffman, Jr. et al. | |
| 2021/0114381 A1 | 4/2021 | Efendi et al. | |
| 2021/0114395 A1 | 4/2021 | Efendi et al. | |
| 2021/0130635 A1 | 5/2021 | Mozel et al. | |
| 2021/0394529 A1 | 12/2021 | Efendi et al. | |

FOREIGN PATENT DOCUMENTS

| | | | |
|---|---|---|---|
| AU | 2021203885 A1 | 7/2021 |
| CA | 2995618 A1 | 2/2017 |
| CN | 101596518 A | 12/2009 |
| CN | 201538103 U | 8/2010 |
| CN | 102619114 A | 8/2012 |
| CN | 103350561 A1 | 10/2013 |
| CN | 108349237 A | 7/2018 |
| CN | 108349237 B | 6/2020 |
| CN | 111806069 A | 10/2020 |
| EP | 1726444 A1 | 11/2006 |
| EP | 2130680 A1 | 12/2009 |
| EP | 2452823 A2 | 5/2012 |
| EP | 1741555 B2 | 7/2015 |
| EP | 3334604 A1 | 6/2018 |
| EP | 3334604 B1 | 9/2020 |
| EP | 3769965 A1 | 1/2021 |
| FR | 2604119 A1 | 3/1988 |
| KR | 20180051535 A | 5/2018 |

(56) References Cited

FOREIGN PATENT DOCUMENTS

| | | | |
|---|---|---|---|
| WO | 2000073071 | A1 | 12/2000 |
| WO | 2001025011 | A1 | 4/2001 |
| WO | 2009079572 | A1 | 6/2009 |
| WO | 2009105693 | A2 | 8/2009 |
| WO | 2017030982 | A1 | 2/2017 |
| WO | 2018078634 | A1 | 5/2018 |
| WO | 2018138720 | A1 | 8/2018 |
| WO | 2019049135 | A1 | 3/2019 |
| WO | 2019077615 | A1 | 4/2019 |
| WO | 2021076294 | A1 | 4/2021 |
| WO | 2021076295 | A1 | 4/2021 |

OTHER PUBLICATIONS

Korean Intellectual Property Office, International Search Report for PCT/US2016/046830, 3 pages, dated Dec. 19, 2016.

Korean Intellectual Property Office, Written Opinion of International Searching Authority for PCT/US2016/046830, 10 pages, dated Dec. 19, 2016.

European Patent Office, Extended European Search Report for Application No. 16837601.0, 8 pages, dated Jan. 8, 2019.

FESPA Staff, "Roq to launch Hybrid DTG printer at FESPA 2017," retrieved on Jun. 14, 2019 from https://www.fespa.com/en/news-media/industry/roq-to-launch-hybrid-dtg-printer-at-fespa-2017, 5 pages, published May 4, 2017.

ROQ, "ROQ Hybrid, A New Dawn For Screen Printing," retrieved on Jun. 14, 2019 from https://roqinternational.com/features/roq-hybrid-a-new-dawn-for-screen-printing/, 5 pages, published Nov. 15, 2016.

ROQ, "ROQ Returns to Maquitex," retrieved on Jun. 14, 2019 from http://roqinternational.com/news/roq-returns-to-maquitex/, 4 pages, published Sep. 11, 2017.

Cahill, Vince, "Hybrid Garment Printing," 19 pages, published Oct. 10, 2019.

Moxley, Michelle, "Best of Both Worlds: Digital Hybrid and Variable Data Printing," Screen Printing, Apr./May 2019, retrieved on Aug. 4, 2020 from https://www.nxtbook.com/nxtbookds/STMG/sp_20190405/index.php#/p/22, 3 pages, published 2019.

Lawson Screen & Digital Products, Inc., "What is Hybrid Printing and the Digital Squeegee," https//www.lawsonsp.com, 11 pages, published Jul. 23, 2019.

European Patent Office, Extended European Search Report for European Application No. 20197322.9, dated Dec. 1, 2020, 9 pages.

Korean Intellectual Property Office, International Search Report for International Application No. PCT/US2020/052547, dated Jan. 12, 2021, 3 pages.

Korean Intellectual Property Office, Written Opinion of the International Searching Authority for International Application No. PCT/US2020/052547, dated Jan. 12, 2021, 6 pages.

Korean Intellectual Property Office, International Search Report for International Application No. PCT/US2020/052546, dated Jan. 13, 2021, 4 pages.

Korean Intellectual Property Office, Written Opinion of the International Searching Authority for International Application No. PCT/US2020/052546, dated Jan. 13, 2021, 8 pages.

China National Intellectual Property Administration, English translation of the Notification of the First Office Action for Chinese Application No. 202010463066.X, dated Apr. 27, 2021, 12 pages.

* cited by examiner

HYBRID SILK SCREEN AND DIRECT-TO-GARMENT PRINTING MACHINE AND PROCESS

CROSS-REFERENCE TO RELATED APPLICATIONS

This application is a continuation of U.S. patent application Ser. No. 16/851,702 filed Apr. 17, 2020, which is a continuation of U.S. patent application Ser. No. 16/192,948 filed Nov. 16, 2018, now U.S. Pat. No. 10,625,517, which is a continuation of U.S. patent application Ser. No. 15/235,982 filed Aug. 12, 2016, now U.S. Pat. No. 10,131,160, which claims priority to U.S. Provisional Patent Application No. 62/205,416 filed on Aug. 14, 2015, the contents of which are incorporated herein by reference and made a part hereof.

FEDERALLY SPONSORED RESEARCH OR DEVELOPMENT

N/A

FIELD OF THE INVENTION

A hybrid printing machine having a silk screening printing station and a direct-to-garment printing station for printing images on textiles and other substrates and a process for printing textiles.

DESCRIPTION OF THE PRIOR ART

Screen printing is an art form that is thousands of years old and involves depositing ink on a screen with a pattern thereon and squeegeeing the ink so that it passes through the screen onto the item to be screened. Screen printing is commonly used for decorating clothing such as T-shirts, pants, and other items like hand bags and totes. Boutiques which specialize in printing fanciful indicia such as ornamentation, slogans, college names, or sports team names on T-shirts and other clothing are commonly seen in shopping malls. The indicia available at these boutiques can be pre-printed on a substrate and applied to articles of clothing purchased by the consumer with a heated press by boutique operators, or can be applied directly to an article of clothing. The indicia can include either simple one-color block letters or elaborate multi-color illustrations.

In common use in the silk screening industry are a multi-station turret type (U.S. Patent Publication No. 2011/0290127) and oval-type (U.S. Patent Publication No. 2010/0000429) printing presses (both of these patent applications are incorporated herein by reference and made a part hereof). These printing presses have a plurality of flat beds or platens spaced along their perimeter, one for each color. The number of stations employed depends on the number of colors to be printed on the object. Indicia can consist of up to ten colors or more.

One significant challenge in screen printing is the time necessary to prepare each screen. The general process for setting-up the screens for printing follows:

First, the artwork is set up. The artwork, in the form of a film positive, is secured on a layout board. Next, a carrier sheet (optically clear polyester film) is placed on the layout board. An individual separates the colors by transferring the artwork by hand to one or more carrier sheets. In this separation/transference process, each carrier sheet represents a separate color to be used in the final screened textile.

Thus, if there are six colors being screened, there will be six carrier sheets (art separations) completed.

Second, the stenciled screens are made (one for each color or print head). The indicia or design is formed in the screen by a conventional process. The mesh of the screen is generally covered with an ultraviolet sensitive emulsion and put into a vacuum exposure unit, basically having a light source, a vacuum, a cover, and a table disposed therebetween. Each carrier sheet is aligned with an emulsion covered, pre-stretched screen such that the carrier sheet is disposed between the light source and the screen. The cover is closed and the screen/carrier sheet combination is subjected to a vacuum, to bring them into contact with one another, and UV light. The exposed screen is then chemically processed resulting in a printing screen. With modern techniques and chemicals, processing can be performed by applying a high power water spray to the exposed screen.

When exposed to ultraviolet (UV) light and processed (often by a power water spray), those portions or mesh of the screen covered (such as by stencil) are left open (interstices are formed), permitting light, paint, or ink to pass through the mesh. Those portions of the screen mesh not covered by a stencil, once exposed and processed, become opaque, blocking the passage of light, paint, or ink through the mesh.

Specifically, those parts of the mesh not exposed to the UV light (the unexposed stencil/design) wash away and produce openings or interstices in the mesh for the ink to pass therethrough during the printing process. The interstices in screen represent the places where ink of a particular color is to be deposited onto the textile or other substrate.

Third, each printing screen is secured to a printing head. One color of ink is then placed into each printing head.

The textiles, one at a time, are loaded onto the travelling pallets and the pallets travel to each of the printing stations, each station having a different color of ink therein. The ink is applied to each textile through the screen at each station. Each textile is cured and the ink permitted to set.

One attempt to speed the screen preparation process is a direct to screen (DTS) machine disclosed in commonly assigned U.S. Patent Publication No. 2014/0261029 which is incorporated herein by reference and made a part hereof. Even with DTS (direct to screen) machines, it can require 10-20 minutes to prepare each screen.

One alternative to screen printing is DTG (direct to garment) digital printers with piezo heads. These DTG machines have the advantage of being able to separate the colors from a digital file loaded onto a computer controller of the machine, and then simply spray the colors onto the garment through piezo heads. The limitation is that the piezo heads can be extremely slow when compared to screen printing, so it has not been economical to use DTG printing machines for large run garment jobs, nor to mix digital printers in with a screen printing machines because it slows the screen printing press down by about a factor of one-half to two thirds.

Also, most garment prints require an under base, which is generally white or very light. Getting enough white pigment through the piezo heads to do the under base, especially on a dark garment that requires a heavy coat, has been and is still very difficult. This has further delayed the wide-spread use of digital printing of textiles.

The present invention provides a machine and process that combines the positive attributes of silk screening and digital printing by dedicating the screen printing process to applying the white or light under base, and dedicating the digital printing to the other colors. Thus, far fewer screens will be required which will result in a significant time savings. The digital printer will be dedicated to applying much smaller volumes of ink and by using a large number of print heads, the speed of the digital printer can match the speed of the silk screening.

BRIEF DESCRIPTION OF THE DRAWINGS

To understand the present invention, it will now be described by way of example, with reference to the accompanying drawings and attachments in which.

DETAILED DESCRIPTION

Figure 1:
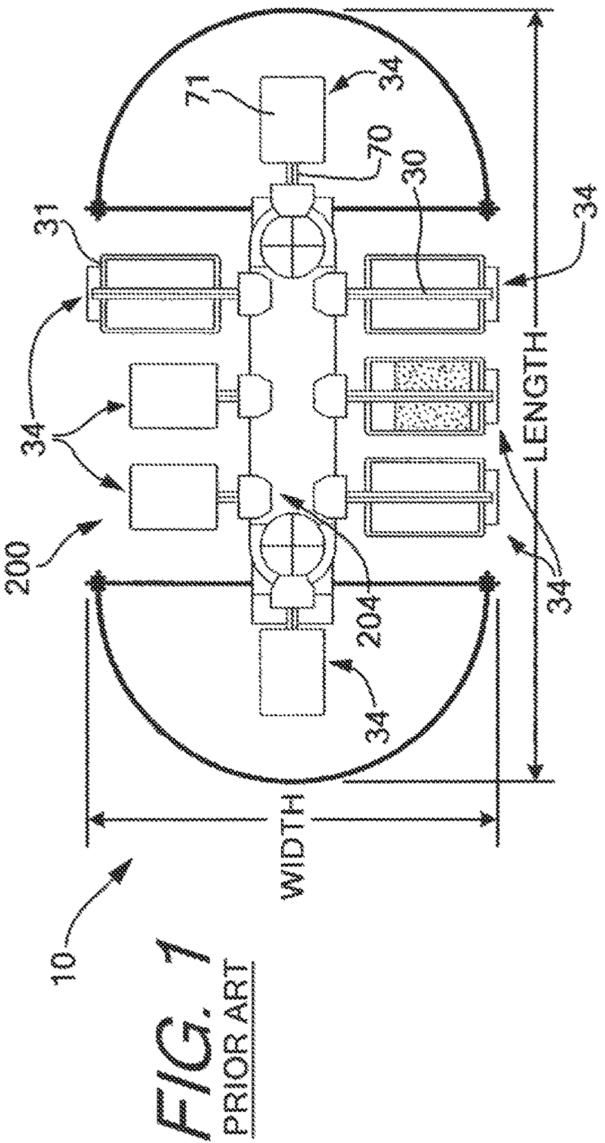
FIG. 1 PRIOR ART
FIG. 1 is a diagrammatic view of an oval printing press from commonly assigned U.S. Patent Publication No. 2010/000429.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
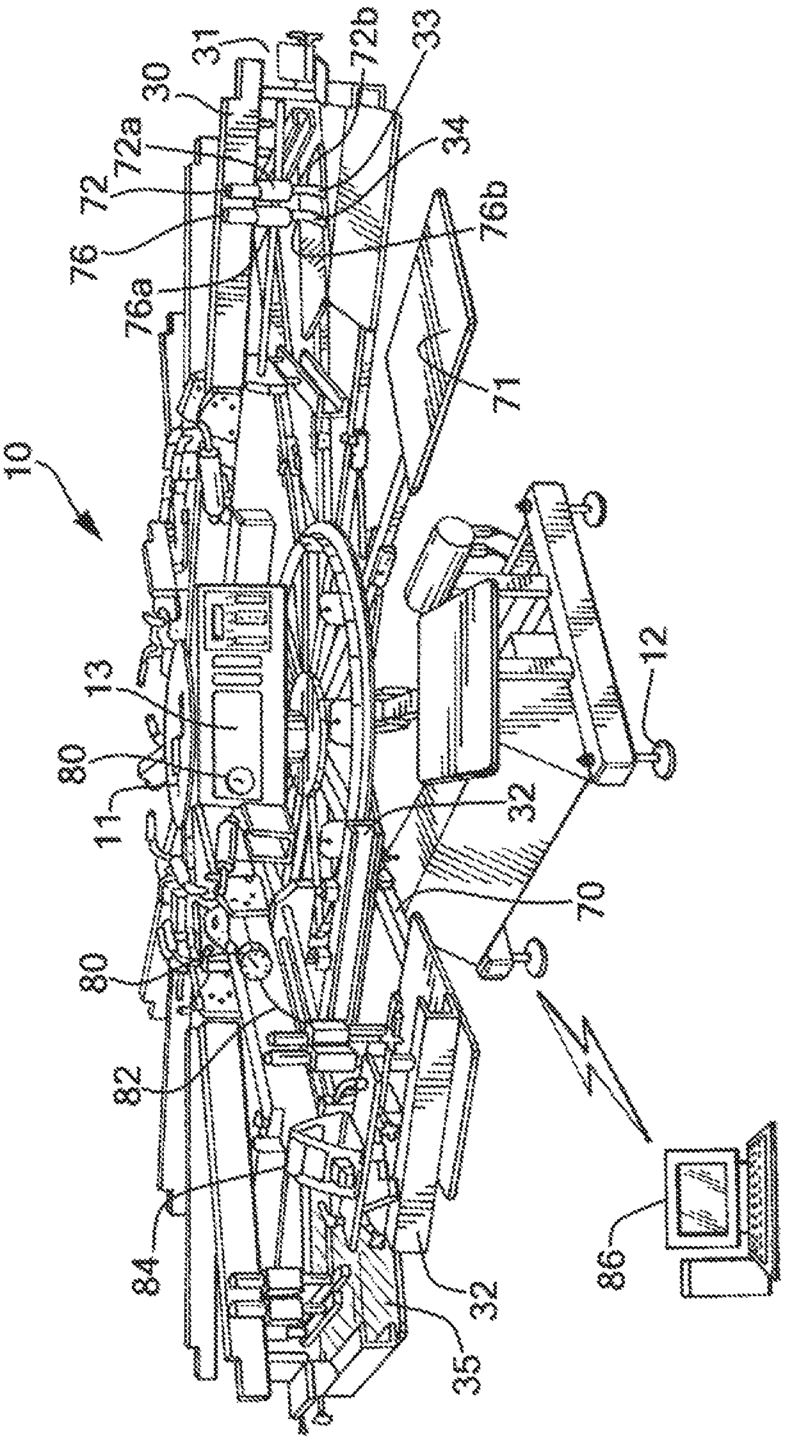
FIG. 2 PRIOR ART
FIG. 2 is a diagrammatic view of a turret-style printing press from commonly assigned U.S. Patent Publication No. 2011/0290127.

FIGS. 1 and 2 show prior art screen printing machine having an oval track or rail (FIG. 1) or a circular track or rail (FIG. 2) about which a series of pallets supporting a work piece are indexed from station to station. The arrangement is such that the pallets travelling about the oval or round rail are maintained in a common plane. There are a variety of station types including a screen printing station, an ink drying or curing station, a loading station, an unloading station and other stations to serve other purposes that are well known to those of ordinary skill in the art.

The screen printing head assembly 20 is pivotally connected on a frame to overlie a pallet and is mounted for movement between a printing position and a non-printing position. The printing head includes a frame for supporting a printing screen that has a desired pattern for printing a white base coat only, as described below. A squeegee carriage carrying a squeegee and a flood bar is movably mounted on the frame for traversing a printing stroke when the head assembly is disposed in the printing position and a flood stroke when the head assembly is in the non-printing position.

Operatively connected to the frame of the head assembly are one or more locating bars which are cooperatively associated with the pallets so as to ensure proper registration of the pallets when the printing head assembly is disposed in the printing position. The conveyor is driven on its endless path by a drive mechanism such as a chain or belt which is threaded about a sprocket journalled on a main drive shaft which is coupled in driving relationship to a drive motor. Operatively associated with the drive mechanism is an indexing system to effect an intermittent indexing of the respective pallets from station to station during machine operation.

Figure 3:
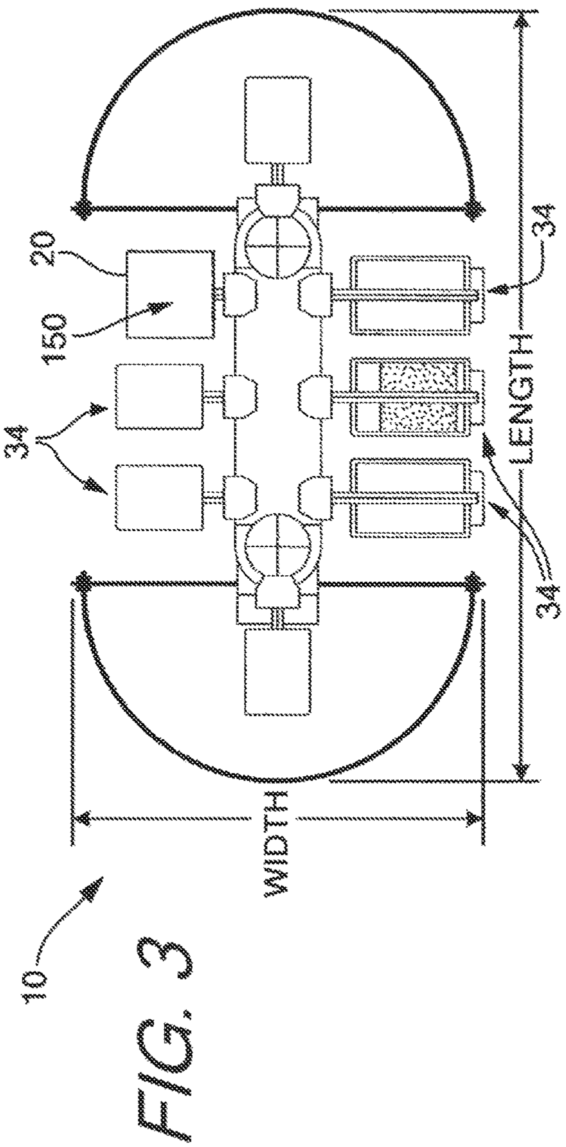
FIG. 3 is a diagrammatic view of a hybrid press having silk screen stations and a direct-to-garment station.

FIG. 3 shows a hybrid printing station 10 having, among the screen printing stations 34 and other stations mentioned above, a direct-to-garment ("DTG") printing station 20. The DTG print station 20 can be integral to the machine or can be a separate, independent unit that is moved into position during print set up for printing in a printing zone 150 of a substrate or textile. The independent unit can include a set of casters or slides (not shown) for ease of movement.

Figure 4B:
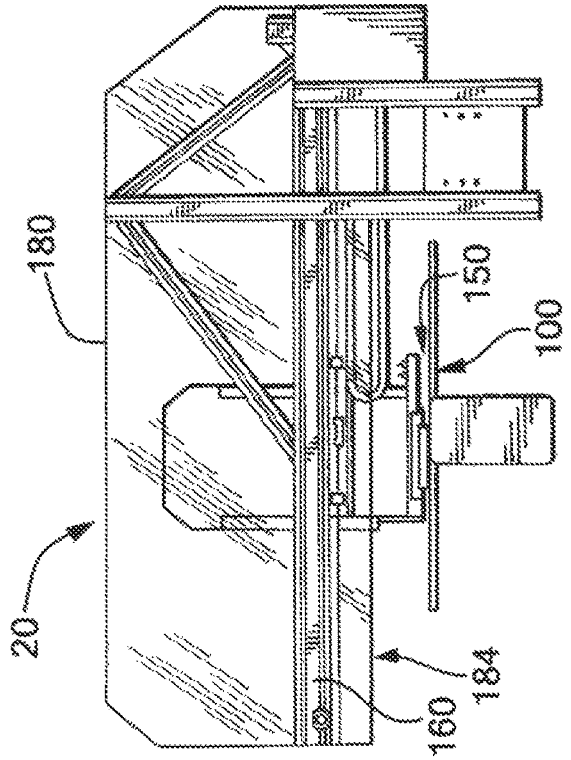
FIGS. 4A and 4B are perspective views of a direct-to-garment printing station in a non-printing position and a printing position respectively.

FIG. 4 shows the DTG print station 20 has a housing 180 enclosing a top portion 182 of a DTG print head array and a carriage 160 for moving along a Y axis of the printing zone 150. The DTG print head array spans a width of the printing area, and, therefore, the carriage only need move in the Y-direction and not the X-direction thereby speeding the printing of an image. A bottom 184 of the DTG print station is open to allow the DTG print head array to cooperatively engage the substrate and print thereon. A printing operation can include from 1 to 10 round trips, more preferably 2 to 8 round trips, and most preferably 3 to 6 round trips. Resolution increases with the number of round trips but the time for completing the printing operation increases with the number of round trips. With four round trips a resolution of 600×900 dots per inch (DPS) can be achieved which is suitable for many print jobs. It is contemplated that with forthcoming improvements in print head technologies that the number of round trips can be reduced to a single round trip to complete printing of a suitable image.

Figure 5:
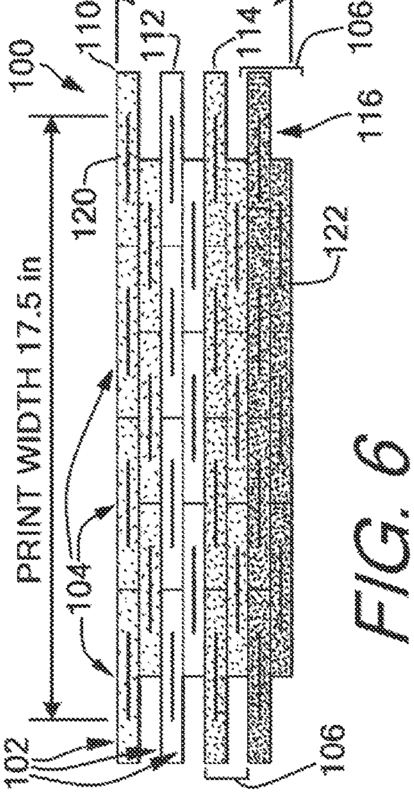
FIG. 5 is a plan view of a direct-to-garment printing head array.

In one preferred form of the invention, the DTG print head 100 is capable of printing in four colors: cyan, magenta, yellow and black, and using combinations of these colors virtually any color can be made. FIG. 5 shows one preferred form of a DTG print head having a plurality of print heads positioned in an array of rows 102 and columns 104. By removing the need for the print head array to move along the X axis, printing speed is substantially increased.

Preferably, there are from 1 to 10 print heads in each row and from 4 to 20 print heads in each column. Each column has from 1 to 5 print heads for each color. In one preferred form of the invention, each column has a plurality of groups 106 of 1 to 5 consecutively stacked print heads and each group is dedicated to a single color. Preferably, each group of print heads is organized by color and preferably in the order of cyan 110, magenta 112, yellow 114, and black 116 from a top or front row 120 to a bottom or back row 122. The number of print heads in each group of the plurality of groups of print heads has the same number of print heads as the other groups or a different number of print heads from the other groups.

Similarly, the number of print heads in each row can be the same or can be different. In one preferred form of the invention, a first row will have n print heads and an adjacent row will have n-x print heads where x is from 1-3 print heads and preferably one. FIG. 5 shows an array having a stack of eight print heads having a first row having four print heads and the next row having three print heads and this pattern repeats for the remaining six rows.

Each print head of the DTG print head can have a single nozzle or a plurality of nozzles such as from 2-12 nozzles, more preferably from 3-10 and most preferably 8 nozzles per print head.

Figure 4A:
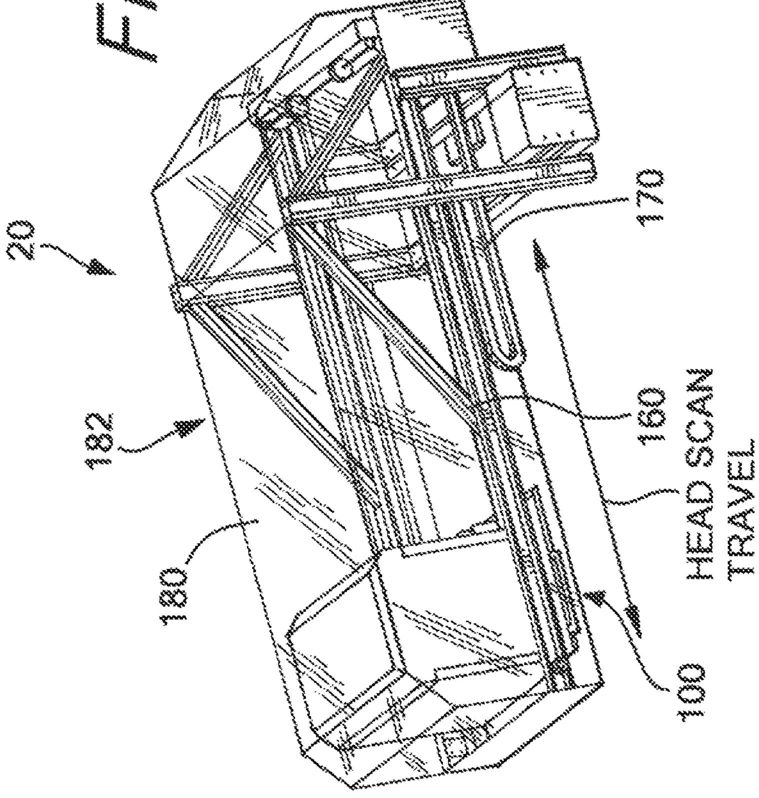
Figure 6:
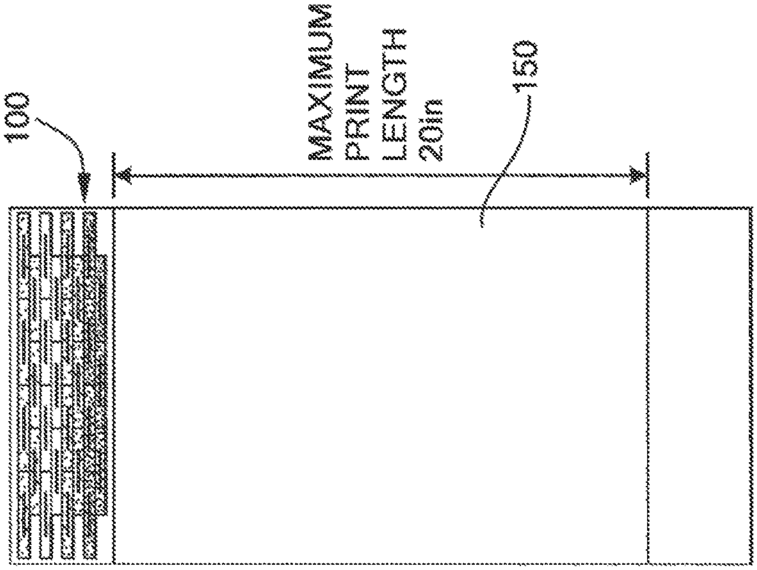
FIG. 6 is a plan view of a direct-to-garment print head and a printing zone of a direct-to-garment printing station.

FIG. 6 shows the DTG print head array 100 in the non-printing position proximate the printing zone 150. FIG. 4A shows a DTG print station 20 having the DTG print head array 100 mounted on a carriage 160 and is moveable by a driver 170 along the Y axis from the non-printing position (FIG. 4A) to a printing position (FIG. 4B) in a round trip. The time for completing the round trip can be determined by the carriage speed which can be from about 10 in/sec to about 50 in/sec, more preferably from about 20 in/sec to about 40 in/sec and most preferably about 30 in/sec.

Figure 7:
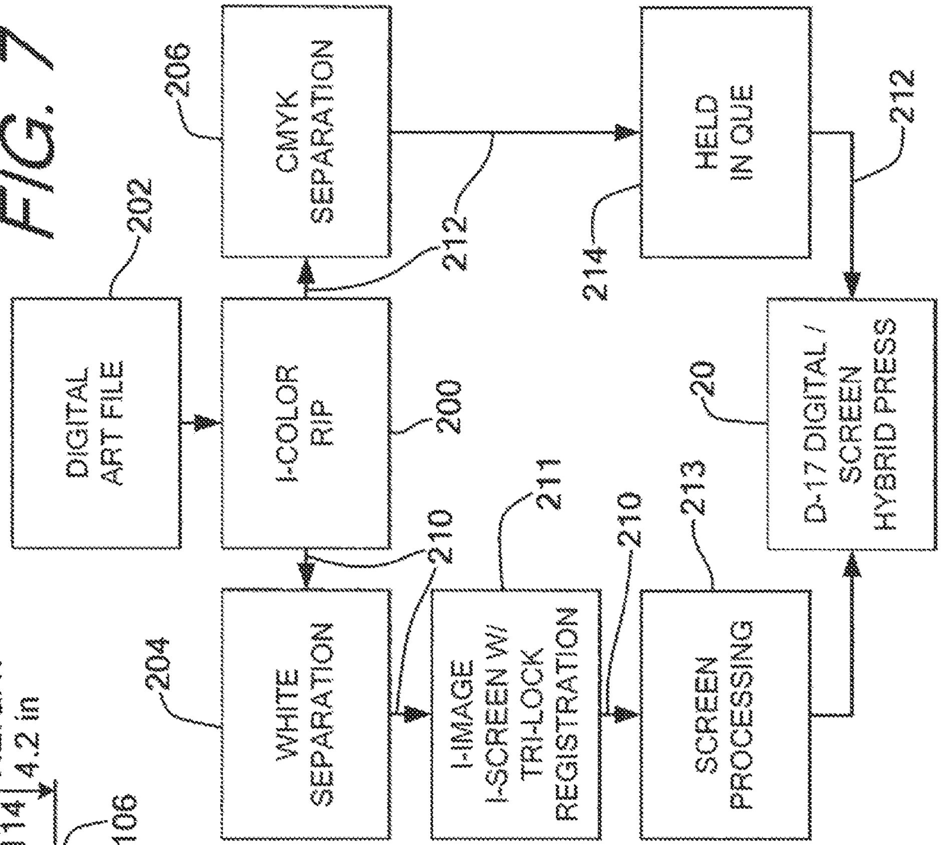
FIG. 7 is a work flow diagram of printing from a digital art file to both a screen printing station and a direct-to-garment printing station.

FIG. 7 shows a work flow diagram for controlling the printing operation. It is desirable to divide the printing operation so that white ink or base coat is applied by a print screening station 34 and the printing of CMYK colors by the DTG print station 20. To this end, a raster image processor 200 (RIP) controls a portion of the printing process and specifically is able to print from a digital art file, loaded into memory of the RIP, containing an electronic representation of the desired indicia to be printed. In addition to the memory, the RIP 200 has a processor and a memory for storing computer-readable instructions for converting the digital art file 202 into two files—the first file 204 representing the base coat location and the second file 206 representing the CMYK location. The RIP sends a first signal 210 representative of the white base coat to a direct to screen (DTS) machine 211 for preparing a screen for printing the base coat. This screen is then processed 213 as described above and is mounted in one of the screen printing heads 34 for a print job. A second signal 212 is sent to a DTG print head queue 214 for printing the CMYK colors on top of the base coat.

The digital art file 202 can be in any suitable format known to those skilled in the art including .jpeg, .pdf, .ppt, .bmp, .dib, .gif, .tiff, .png, and .ico.

Suitable inks for printing by the hybrid printing machine includes, for example, plastisol (with and without additives, such as expanding inks), water based inks, PVC (preferably phthalate free), discharge inks (which remove die), foil, glitter/shimmer, metallic, caviar beads, glosses, nylobond, mirrored silver and other solvent based inks. Textiles include natural and artificial fibers from animals (e.g., wool and silk), plants (e.g., cotton, flax, jute, hemp, modal, piña and ramie), minerals (e.g., glass fibers) and synthetics (e.g., polyester, aramid, acrylic, nylon, spandex/polyurethane, olefin, ingeo and lurex). Each combination of ink and textile will demonstrate different properties, such as those associated with wicking, holding, hand, penetration and appearance.

The process of printing an indicia onto a substrate includes the steps of loading a digital art file of the indicia into a memory, converting the digital art file into two files, a first file representative of a white base coat portion of the indicia and a second file representative of the CYMK colors of the indicia. Using a processor, sending a signal representative of the first file to a DTS machine to prepare a screen for printing the base coat on a substrate or textile. Sending a second signal to a DTG print station where it is held in memory. The screen for the base coat is loaded onto a screen printing station of a hybrid printing machine and the station is loaded with a white or light colored ink. A textile is loaded onto a platen of a hybrid machine and conveyed into a position under the silk screen printing station and the base coat is applied to form a prepared textile. The platen of the hybrid machine is then conveyed to a position under the DTG print station and the CMYK colors are printed on the prepared textile on top of the base coat in accordance with the second file. Preferably, the DTG print station has a DTG print head with an array of print heads that span a width dimension of the indicia such that the DTG print head need only be moved along a length dimension of the indicia to form the indicia. Upon completion of the printing, the ink is cured or dried and the completed textile can be sold or packaged for sale.

Many modifications and variations of the present invention are possible in light of the above teachings. It is, therefore, to be understood within the scope of the appended claims the invention may be protected otherwise than as specifically described.

We claim:

1. A method of printing on a substrate with a printing press system having a plurality of pallets, a direct-to-screen printing station, a screen printing station and a direct-to-garment printing station, the method comprising:

providing a digital art file of an image;

using a processor to create a first signal representative of a base coat from the digital art file and a second signal representative of non-base coat colors from the digital art file;

sending the first signal to the direct-to-screen printing station to apply to a screen and creating the screen for use in applying the base coat to a substrate;

applying the base coat to the substrate on the first one of the plurality of pallets by the screen printing station using the screen;

moving the first one of the plurality of pallets to the direct-to-garment printing station;

sending the second signal representative of non-base coat colors to the direct-to-garment printing station; and, applying the non-base coat colors to the substrate on the first one of the plurality of pallets by the direct-to-garment printing station.

2. The method of claim 1 wherein the processor is a raster image processor.

3. The method of claim 2 further comprising:

mounting the screen in the screen printer.

4. The method of claim 3 further comprising:

loading the digital art file onto a processor coupled to the printing press.

5. The method of claim 1 further comprising:

providing the direct-to-garment printing station with a print head array that spans a width of a printing area.

6. The method of claim 5 further comprising:

moving the print head over the substrate in a single direction to print the non-base colors on the substrate.

7. The method of claim 5 wherein the step of providing the direct-to-garment printing station with a print head array that spans a width of a printing area comprise:

providing a first row of a plurality of print heads; and, providing a second row of a plurality of print heads where each print head of the second row of a plurality of print heads is aligned with a print head of the first row of a plurality of print heads to form a plurality of columns of print heads.

8. The method of claim 7 further comprising:

providing a plurality of additional rows of a plurality of print heads.

9. The method of claim 8 wherein the first row of a plurality of print heads has ten print heads.

10. The method of claim 8 wherein each row of a plurality of print heads prints a different color.

11. The method of claim 5 further comprising:

moving the print head array along only a length dimension of an area to be printed on the substrate.

12. The method of claim 1 wherein the substrate is a textile.

13. The method of claim 1 further comprising:
curing the non-base coat colors printed on the substrate.

14. The method of claim 1 further comprising:
drying the non-base coat colors printed on the substrate.

15. The method of claim 1 wherein the printing press includes a conveyor, the method including:
moving the plurality of pallets by the conveyor.

16. The method of claim 15 wherein the step of moving the plurality of pallets by the conveyor comprises:
moving the plurality of pallets in a circular path.

17. The method of claim 15 wherein the step of moving the plurality of pallets by the conveyor comprises:
moving the plurality of pallets in an oval path.

18. The method of claim 1 further comprising:
providing a raster image processor for controlling a portion of the printing process.

19. The method of claim 18 further comprising:
converting a digital file into a first file representing a base coat location and a second file representing a non-base coat location by the raster image processor.

20. The method of claim 19 further comprising:
sending the first file to the screen printing station and the second file to the direct-to-garment printing station.

* * * * *